United States Patent [19]

Bode et al.

[11] 4,087,164

[45] May 2, 1978

[54] MOTION PICTURE CAMERA

[75] Inventors: Kurt Bode; Heinz Vehrke, both of Brunswick, Germany

[73] Assignee: Rollei-Werke Franke & Heidecke, Brunswick, Germany

[21] Appl. No.: 719,091

[22] Filed: Aug. 31, 1976

[30] Foreign Application Priority Data

Sep. 6, 1975 Germany .............................. 2539792

[51] Int. Cl.² ............................................. G03B 7/08
[52] U.S. Cl. ...................................... 352/141; 354/56
[58] Field of Search ...................... 352/141, 109, 160; 354/56

[56] References Cited

U.S. PATENT DOCUMENTS

| | | | |
|---|---|---|---|
| 3,067,284 | 12/1962 | Baldwin | 352/109 |
| 3,248,166 | 4/1966 | Reinsch | 352/141 |
| 3,486,814 | 12/1969 | Kubota | 352/141 |
| 3,497,295 | 2/1970 | Stieringer | 352/141 |
| 3,791,725 | 2/1974 | Young | 352/160 |

FOREIGN PATENT DOCUMENTS 1,301,643   7/1962   France ................................. 352/141

*Primary Examiner*—Monroe H. Hayes
*Attorney, Agent, or Firm*—Stonebraker, Shepard & Stephens

[57] ABSTRACT

A motion picture camera wherein a part of the light entering the camera lens from the subject being photographed is reflected by a reflector on the shutter to a light sensitive element of exposure metering means. In order to insure that, for a given degree of brightness of the scene, the same quantity of light reaches the sensitive element regardless of whether the shutter is in motion or is stationary, an adjustable reflector is interposed between the shutter and the light sensitive element. This adjustable reflector is shifted from one position to another position by operation of the camera release member. A bendable ear is provided for calibration purposes.

7 Claims, 1 Drawing Figure

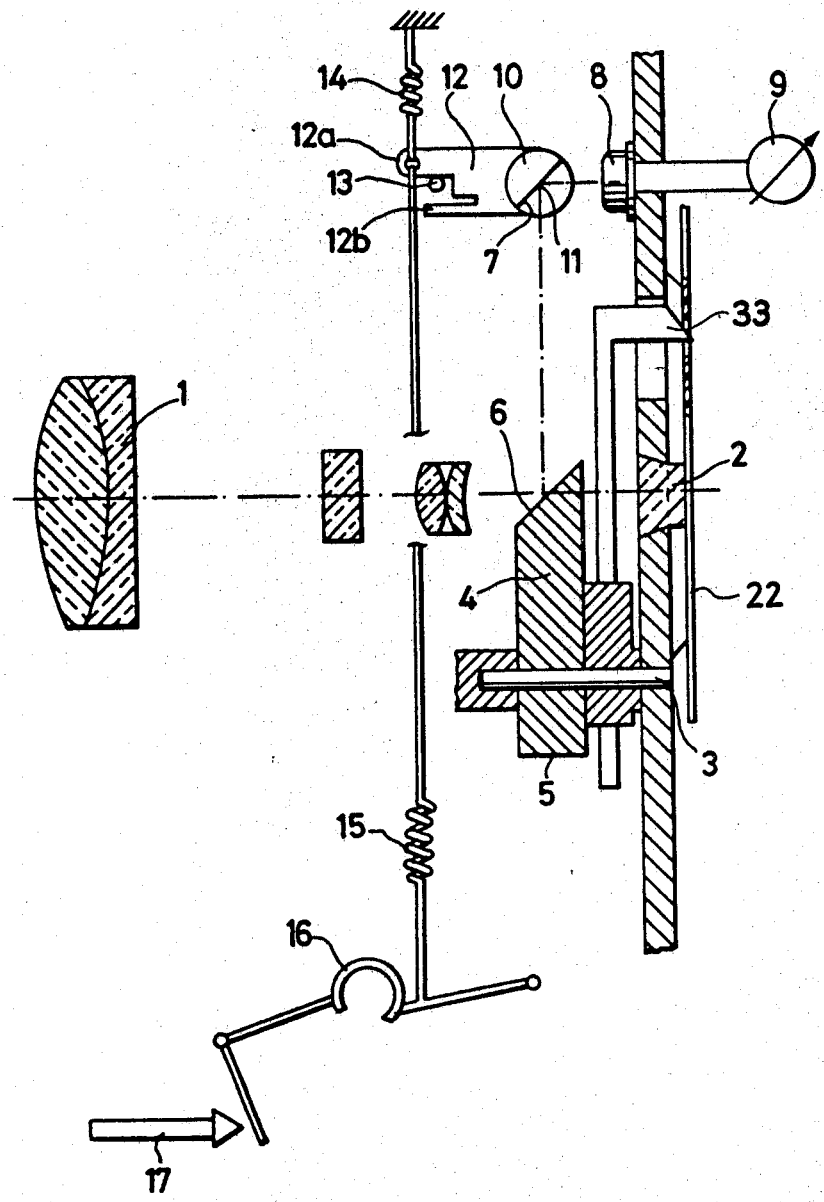

MOTION PICTURE CAMERA

BACKGROUND OF THE INVENTION

In certain known types of motion picture cameras, an exposure metering device is provided, whose light sensitive element receives light coming through the camera lens by means of a reflecting surface arranged on the shutter. In this connection, the expressions "metering device" and "metering means" are intended to be interpreted in a broad sense, including devices which merely give an indication of the correct exposure without actually adjusting or controlling the exposure, and also devices which actually adjust or control the exposure, without necessarily giving a visible indication of the correct exposure or its numerical value.

It is desirable to provide the light sensitive element or photoelectric element of the exposure metering means with the same amount of light (for a given brightness of scene) at regular intervals, regardless of whether the shutter is rotating or is stationary. In known cameras of this type, the means for providing the photoelectric element with the same quantity of light consists, for example, in providing a frosted reflecting surface on that portion of the shutter which is located behind the lens, in the stationary state of the shutter. By this means, the light intensity measured behind the lens is reduced, when the shutter is stationary, by an amount corresponding to the recess on the rotating reflecting surface. It is very difficult to bring about an accurate behavior of the frosted surface so that it is always the same in different cameras being constructed in sequence. Moreover, there is usually a certain range of tolerance in the light sensitive elements installed in the cameras. Therefore, an accurate setting of the exposure metering means is very difficult to achieve, to obtain uniformity in both the rotating and the stationary positions of the shutter, and a relatively wide tolerance has had to be accepted, in the past, within the production run of manufacturing a quantity of theoretically identical cameras.

The object of the present invention, therefore, is to provide a camera of this type with means for delivering the same amount of light to the light sensitive element at regular intervals, with the shutter rotating and with the shutter stationary.

Another object is to provide for a simple calibration adjustment capable of being made easily during the assembly of the camera, to set the exposure metering means accurately, thus compensating for the inevitable tolerances of the constructional elements.

SUMMARY OF THE INVENTION

According to the present invention, the above mentioned objects are accomplished by arranging in the ray path between the shutter and the light sensitive element a reflective surface which can be swung from one to the other of two positions, in both of which it conducts light to the light sensitive element, but in one of which, corresponding to the stationary position of the shutter, the light transmitted to the light sensitive element is cut down or reduced as compared to the amount of light reaching this element when the shutter is rotating. By a slight variation of one or both of the fixed limit positions of the reflective surface, it is possible to achieve an accurate setting of the exposure metering device in either operating condition of the shutter.

According to a further development of the invention, this can be implemented in a particularly simple manner if the reflective surface is rigidly connected to a bracket abutting a stop member in either of the two limit positions, and if an adjustment is provided for at least the stop means which determines the position of the reflective surface when the shutter is stationary. It is particularly easy to provide such an adjustment by designing the bracket with a bendable tongue, with which it abuts the stationary stop member in the reflective surface position associated with the stationary shutter. The exact position of the reflective surface when the shutter is stationary, can thus be calibrated by a simple bending of the tongue.

In a further development of the invention, means is provided for shifting the reflective surface by operation of the camera release, so that when the camera release member is operated to cause the shutter to rotate, this swings the reflective surface to one of its limit positions, and when the camera release member is let go, to stop the rotation of the shutter, this swings the reflective member to the other of its limit positions.

In a further development of the invention, this means for shifting the reflective surface upon operation of the camera release member, comprises a snap-action switch or toggle switch which is actuated by the camera release member and which acts on the bracket connected to the reflective surface, to hold the bracket in the position associated with the rotating shutter, when the camera release is pressed, and a spring which acts on the bracket and which loads the bracket in the opposite direction and which is operative when the camera release member is released.

BRIEF DESCRIPTION OF THE DRAWING

The single FIGURE is somewhat schematic or diagrammatic illustration of the invention, largely in the form of a section taken along the optical axis of the camera.

DESCRIPTION OF THE PREFERRED EMBODIMENT

The lens of a motion picture camera is indicated schematically at 1, and is mounted in the usual way in a suitable housing or casing which is of conventional form and is not illustrated. Through this lens, which may have a number of components, light passes to the film gate aperture 2 and to the sensitized film 22, located behind this aperture, the film being advanced intermittently or step by step in the usual manner by means of a conventional claw 33.

Rotating on the shaft 3 is a shutter 4 arranged in known manner in the ray path between the lens 1 and the film gate aperture 2. The shutter is designed like a truncated cone and is arranged so that the body of the cone lies in the ray path between the lens and the film, except where a portion of the cone is cut away at 5, so that as the shutter rotates, light may pass along the optical axis to the film when the cut away portion 5 is momentarily at the optical axis. Except at this cut away portion 5, the frusto-conical edge 6 of the shutter lies in the path of the light beam or ray entering the camera. This frusto-conical surface 6 is a reflecting surface, and reflects the light coming through the lens of the camera at a specific angle, preferably 90°.

In the ray path of this reflected light reflected by the surface 6, there is arranged another reflective surface 7 which has such a position that, when the shutter 4 is rotating, it will receive the light reflected from the surface 6 of the shutter and conduct such light to the light sensitive element 8 of the exposure metering device or means. This light sensitive element 8 is connected to a device 9, which may be either a meter observable by the operator to indicate to him the proper shutter speed or lens aperture to be set, or a device of known conventional construction which actually controls either the shutter speed or the lens aperture or both.

The reflecting surface 7 is arranged in roller 10, diametrically with respect to the rotary axis 11 thereof. A bracket 12 is firmly connected to the roller 10, to swing therewith as the roller turns. This bracket 12 is bifurcated, having one arm 12a and a second arm 12b lying on opposite sides of a fixed stop member 13. As will be readily seen in the drawing, the arm 12a of the bracket will come into contact with the fixed stop 13 to limit the swinging of the roller 10 and reflector 7 in a counterclockwise direction, while the other arm 12b will come into contact with the fixed stop 13 to limit the rotation of the roller 10 and reflecting surface 7 in the opposite or clockwise direction. The arm 12b is in the form of a bendable ear, which can be readily bent during the process of assembling the camera, to provide a fine calibration or adjustment of the exact position of the reflecting surface 7 and roller 10 at its clockwise limit of motion.

A spring 14 acts on the arm 12a to bias it in a clockwise direction, to tend to hold the arm 12b tight against the fixed stop 13. Another spring 15 has one end also connected to the arm 12a to tend to pull it the opposite or counterclockwise direction. The opposite end of this spring 15 is connected to a snap-action member or toggle member indicated schematically at 16, which is operated by the camera release member 17. When the camera release member 17 is pressed rightwardly when viewed as in the drawing, to start the operation of the camera in the conventional way, this causes the snap-action or dead-center member 16 to push downwardly on the part thereof that is connected to the lower end of the spring 15, pulling downwardly on this spring. The spring 15 is stronger than the spring 14, so the bracket 12 will be pulled downwardly until the arm 12a thereof comes into contact with the fixed stop 13. This will swing the reflecting member 7 counterclockwise to its limit position corresponding to the rotation of the shutter, and during the rotation, light will be reflected from the reflecting surface 6 of the shutter to the reflecting surface 7, and from the latter to the light sensitive element 8. When it is desired to stop the action of the camera, the camera release member 17 is let go or released, and the action of the springs 14 and 15 swing the dead-center actuator over to the opposite side of its dead-center, releasing the downward pull on the spring 15 sufficiently so that the spring 14 can now swing the bracket arm 12 upwardly or clockwise until the arm 12b thereof comes into contact with the fixed stop 13. This swings the reflecting surface 7 slightly in a clockwise direction, sufficiently to cut down the transmission of reflected light on to the light sensitive element 8 just enough to compensate for the fact that the shutter is now stationary rather than rotating. Assuming that the scene brightness remains the same as it was while the shutter was rotating, the same amount of light will now fall on the light sensitive element 8 as when the shutter was rotating, and the meter or control mechanism 9 will be actuated to the same extent.

It is believed the operation will be clear from what has been said above. When the shutter of the camera is operating and the reflecting member 7 is at its counterclockwise limit of motion, almost the entire light reflected by the reflecting surface 6 of the shutter and passing to the reflecting surface 7 will be conducted to the light sensitive element 8. When the operation of the camera is stopped so that the shutter no longer rotates, a considerably greater amount of light entering the camera is reflected by the shutter surface 6 onto the reflecting surface 7, as well understood in the art. But at this time the position of the reflecting surface 7 is shifted to its clockwise limit of motion, cutting down the amount of light transmitted from the surface 7 to the light sensitive element 8, just enough to compensate for the greater amount of light reflected by the shutter surface 6. Notwithstanding tolerance variations in the light sensitive element 8 or in the reflective efficiency of the shutter surface 6, from one camera to another during a production run of a number of such cameras, the light transmission from the surface 7 to the element 8 can be easily calibrated or adjusted to achieve just the right amount of light transmission to the element 8, by bending the bendable tongue 12b. With the camera not operating (that is, with the shutter 4 not rotating) the downward spring force acting through the spring 15 and its connections onto the bracket 12, is either zero, or is at least less than the upward force exerted by the spring 14.

It is seen from the foregoing that the above mentioned objects of the invention have been well achieved in a simple manner.

What is claimed is:

1. A motion picture camera comprising a lens, a shutter mounted for rotation when the camera is operating and remaining stationary when the camera is not operating, a reflecting surface on said shutter for reflecting light received through said lens, exposure metering means including a light sensitive element responsive to light received from said reflecting surface on said shutter, and light reflecting means operatively interposed in a path of travel of light from said reflecting surface on said shutter to said light sensitive element, said reflecting means being mounted for movement from a first position when said shutter is rotating to a second position when said shutter is stationary, said movable reflecting means being arranged to transmit to said light sensitive element a greater proportion of the light reflected by said shutter when said reflecting means is in its said first position and a lesser proportion thereof when said reflecting means is in its said second position.

2. A camera as defined in claim 1, further comprising adjustable stop means for determining one of said two positions of said reflecting means.

3. A camera as defined in claim 2, wherein said adjustable stop means comprises a bendable member.

4. A camera as defined in claim 1, wherein said movable light reflecting means is mounted on a bracket having abutment surfaces abutting against stop means to determine said first and second positions of said reflecting means.

5. A camera as defined in claim 4, wherein said abutment on said bracket which abuts against said stop means in said second position is bendable for adjustment of said second position.

6. A camera as defined in claim 1, further comprising a camera release member operable to cause rotation of said shutter, and means controlled by said release member for moving said movable light reflecting means from one to another of its two positions.

7. A camera as defined in claim 6, wherein said means controlled by said release member includes an over-dead-center device effective to hold said movable reflecting means in its said first position when said camera release member is in a position for rotation of said shutter, and spring means effective to hold said movable reflecting means in its said second position when said camera release member is in a position rendering said shutter stationary.

* * * * *